US011030667B1

(12) United States Patent
Prado et al.

(10) Patent No.: US 11,030,667 B1
(45) Date of Patent: Jun. 8, 2021

(54) METHOD, MEDIUM, AND SYSTEM FOR RECOMMENDING COMPOSITIONS OF PRODUCT FEATURES USING REGRESSION TREES

(71) Applicant: EMC IP Holding Company LLC, Hopkinton, MA (US)

(72) Inventors: Adriana Bechara Prado, Rio de Janiero (BR); Victor Bursztyn, Rio de Janiero (BR); Jonas F. Dias, Rio de Janiero (BR); André de Almeida Maximo, Rio de Janiero (BR); Angelo E. M. Ciarlini, Rio de Janiero (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 530 days.

(21) Appl. No.: 15/338,617

(22) Filed: Oct. 31, 2016

(51) Int. Cl.
*G06Q 30/00* (2012.01)
*G06Q 30/06* (2012.01)
*G06N 5/04* (2006.01)

(52) U.S. Cl.
CPC .......... *G06Q 30/0631* (2013.01); *G06N 5/04* (2013.01)

(58) Field of Classification Search
CPC ............................ G06Q 30/0631; G06N 5/04
See application file for complete search history.

(56) References Cited

U.S. PATENT DOCUMENTS

| | | | |
|---|---|---|---|
| 6,505,185 B1 * | 1/2003 | Chickering | G06K 9/6282 706/55 |
| 2002/0194058 A1 * | 12/2002 | Eldering | G06Q 20/20 705/14.65 |

(Continued)

FOREIGN PATENT DOCUMENTS

| | | | | |
|---|---|---|---|---|
| CA | 2942325 A1 * | 3/2018 | ............. | G06F 17/10 |
| WO | WO-2011050205 A1 * | 4/2011 | ............. | G06Q 10/04 |

OTHER PUBLICATIONS

Michael Bowles, Machine Learning in Python: Essential Techniques for Predictive Analysis, Copyright 2015, Wiley Publishing, ISBN 978-1-118-96174-2, Figure 6-1 on p. 214. (Year: 2015).*

(Continued)

*Primary Examiner* — Matthew E Zimmerman
(74) *Attorney, Agent, or Firm* — Ryan, Mason & Lewis, LLP (57) ABSTRACT

Product planning techniques are provided that recommend compositions of product features for weighted heterogeneous consumer segments using regression trees. An exemplary method comprises obtaining historical consumer data comprising product preferences for existing product items for multiple consumer segments; obtaining product features indicating characteristics for each existing product item; prioritizing the consumer segments by obtaining a weight indicating an interest in each consumer segment; computing a total performance metric, for each product item, by calculating a dot product between the consumer segment weights and respective preferences of the consumer segments regarding a given product item; obtaining a regression tree from the existing product items to predict the total performance metric in terms of corresponding product features; and selecting a combination of the product features to be used in future product items based on identified paths in the regression tree.

20 Claims, 8 Drawing Sheets

(56) References Cited

U.S. PATENT DOCUMENTS

| | | | | |
|---|---|---|---|---|
| 2006/0111964 A1* | 5/2006 | Bingham | ............... | G06Q 10/06 |
| | | | | 705/7.29 |
| 2009/0037267 A1* | 2/2009 | Duggal | ................. | G06Q 30/02 |
| | | | | 705/14.48 |
| 2013/0117071 A1* | 5/2013 | Kwon | ................ | G06Q 30/0201 |
| | | | | 705/7.32 |
| 2016/0019587 A1* | 1/2016 | Hueter | ................... | G06N 20/00 |
| | | | | 705/14.53 |

OTHER PUBLICATIONS

Hird, Abigail, et al. "New product development resource forecasting." R&D Management 46.5 (2016): 857-871. (Year: 2016).*
Bursztyn et al., "Recommending Features for Content Planning Based on Advertiser Polling and Historical Audience Measurements", U.S. Appl. No. 15/223,471, filed Jul. 29, 2016.

* cited by examiner

METHOD, MEDIUM, AND SYSTEM FOR RECOMMENDING COMPOSITIONS OF PRODUCT FEATURES USING REGRESSION TREES

FIELD

The invention relates generally to the production of products based on an analysis of consumer preference data.

BACKGROUND

Many traditional industries that were not born in the Digital Age have long dealt with complexity in the planning of upcoming products. Some have employed in-person polling services that are costly, risky (due to poor sampling) and show relatively low return-on-investment. Others rely on the experience of highly intuitive professionals, who also have high costs due to their high earnings and to the risks of wrongful intuition that may lead to poor decision making. There is a need for data-driven solutions that enable more effective product planning and decision-making.

A number of emerging contenders pose threats for several traditional industries, particularly by making better use of data. Internet-based content channels, for example, have created new content by analyzing the interests of strategic consumer segments and creating content that can potentially appeal to them, indirectly satisfying advertisers interested in reaching such segments.

Generally, methods that combine interests from multiple stakeholders and intelligently use such a combination to mine past data represent a great opportunity to help these industries overcome poor decision making and become more competitive. U.S. patent application Ser. No. 15/223,471 (now U.S. Pat. No. 10,448,120), filed Jul. 29, 2016, entitled "Recommending Features for Content Planning Based on Advertiser Polling and Historical Audience Measurements," discloses content planning techniques that recommend content features based on the investment interest of advertisers in various consumer segments and historical audience measurements.

A need exists for improved techniques for finding a composition of product features that improves product performance for a weighted combination of heterogeneous consumer segments.

SUMMARY

Illustrative embodiments of the present invention provide product planning techniques that recommend compositions of product features for weighted heterogeneous consumer segments using regression trees. In one exemplary embodiment, a method comprises the steps of obtaining historical consumer data comprising product preferences for a plurality of existing product items for a plurality of consumer segments, wherein the product preferences comprise at least one performance metric for each product item and consumer segment pair; obtaining, for each of the plurality of existing product items, a plurality of product features indicating characteristics of a corresponding product item; prioritizing a plurality of the consumer segments by obtaining a weight, for each of a plurality of the consumer segments, indicating an interest in a given consumer segment; computing, using at least one processing device, a total performance metric, for each product item, by calculating a dot product between the weights for the plurality of consumer segments and respective preferences of the plurality of consumer segments regarding a given product item; obtaining a regression tree from the existing product items to predict the total performance metric in terms of corresponding product features; and selecting, using at least one processing device, a combination of the product features to be used in future product items based on one or more identified paths in the regression tree.

In one or more embodiments, the identified paths in the regression tree comprise one or more of a path having a leaf node with a substantially highest predicted value and one or more paths having a balance of one or more of predicted value, prediction error, and prediction number of samples, which satisfies one or more predefined criteria. One or more paths that fail one or more predefined domain-related constraints are optionally removed from the one or more identified paths.

In at least one embodiment, the prioritization weight is based on amounts of money one or more stakeholders expect to spend on targeting each of the plurality of consumer segments and/or a potential market estimation for each of the plurality of consumer segments.

In one or more exemplary embodiments, the given future product item comprises a plurality of components over time and wherein the method is separately applied to one or more components of the given future product item. The method is optionally dynamically applied to a given component of the given future product item as the given component is generated. One or more constraints are optionally applied to the given component based on one or more prior components.

As noted above, illustrative embodiments described herein provide significant improvements relative to conventional product planning techniques by combining the investment interest of stakeholders with consumer interest in past products. These and other features and advantages of the present invention will become more readily apparent from the accompanying drawings and the following detailed description.

DETAILED DESCRIPTION

Illustrative embodiments of the present invention will be described herein with reference to exemplary communication, storage, and processing devices. It is to be appreciated, however, that the invention is not restricted to use with the particular illustrative configurations shown. Aspects of the present invention provide methods and apparatus for product planning that recommend compositions of product features for weighted heterogeneous consumer segments using regression trees.

One or more embodiments of the invention find a composition of features that substantially optimizes (or improves) product performance for a weighted combination of heterogeneous consumer segments. It is noted that this is different from finding the most popular features. Some features might be attractive for one segment and might cause rejection in another segment. At least one embodiment of the invention also deals with the need to select a composition of features in the presence of constraints to be met and when products have to be created on the fly.

At least one embodiment of the invention provides an approach for delivering value to the product planning process based on the interests of stakeholders. In at least one embodiment, regression trees are learned on demand to explain how a composition of features leads to diverse performance values when considering different weights for heterogeneous consumer segments. The hierarchical organization of product features provides more comprehensive and ready-to-use insights regarding the product planning process. In addition, as the weights of consumer segments might change over time, the method allows for the dynamic re-planning of products even in this situation.

Given a set of production-related constraints regarding the use of a set of features, the disclosed method gives the user the ability to optionally apply these constraints while choosing the most attractive features. In addition to the constraints and to the overall predicted performance as given by the regression tree, the user can also optionally take into account criteria such as the prediction error associated with the path (e.g., 'mse' (mean squared error) value associated with leaf nodes of the regression tree) and/or a number of rows supporting each path in the regression trees, i.e., the number of evidences for the decision (e.g., 'samples' value associated with the leaves).

By using regression trees in one or more embodiments, on-demand creation of hierarchies of features is enabled, highlighting the compositions that are more likely to separate successful products from failures. Thus, at least one embodiment of the invention addresses the dynamic nature of the problem, that is, the cases in which either consumption behavior or the proportional interests in specific segments change rapidly. Dynamic planning is enabled by breaking a product into smaller pieces. For instance, in the case of a soap opera, the soap opera can be divided into chapters, which would enable the planning of upcoming chapters on the fly.

Suppose that the usual practice of a company is to offer products in a business channel that attracts heterogeneous segments of consumers. Also, consider that features of these products are fundamental for attracting or repelling certain consumer segments. One goal is, during the planning of a new product, to select a composition of features that attracts a targeted combination of consumer segments.

Suppose that television programs are broadcast on a television channel Television programs with specific features are expected to attract certain segments of audiences and repel others. In this context, one goal is to enable data-driven television program planning based on a targeted combination of heterogeneous audiences.

Additionally, consider that features such as actors, directors or writers have inherent costs and constraints. Even subjects to be addressed by television programs should be considered as limited resources. For example, certain subjects are constrained by the capacity of a company to move the staff of a television program geographically. Similarly, certain subjects could not be combined with certain actors or writers, so the combinations of features are also inherently constrained.

Furthermore, the company running the channel is likely to re-evaluate its main targets from time to time. Shifts among the interests of the company's stakeholders could cause it to change the offering of its products. In an exemplary television setting, different advertisers target different segments of audiences according to their own strategic interests. The combination of advertisers' targets indicate the most important segments. This causes the television company to create or to modify television programs, making good use of the features that attract such segments.

How to make data-driven decisions in the planning of a new product to be consumed by heterogeneous consumer segments is a challenge addressed by the present invention. Generalizing the above scenario, the following challenges are present:

The techniques described in U.S. patent application Ser. No. 15/223,471 (now U.S. Pat. No. 10,448,120), filed Jul. 29, 2016, entitled "Recommending Features for Content Planning Based on Advertiser Polling and Historical Audience Measurements," incorporated by reference herein, generate a rank of product features, or sets of features, that are treated as contributors to the success of products. These features are extracted from previously produced products that triumphed in attracting a desired combination of segments. Note, however, that the most frequent features in the set of the most attractive products (i.e., the reference products) might also exist in the set of the least attractive products. In this case, product features would not be exclusively related to the success of products. As a more illustrative example, consider that given a combination of targeted segments of consumers, a particular director of photography happens to not only take part in all of the most effective soap operas from the past, but also in the least effective ones. So, although that director would be a recommended feature in the method of U.S. patent application Ser. No. 15/223,471 (now U.S. Pat. No. 10,448,120), its effectiveness may be questioned.

One or more embodiments of the present invention identify a composition of features that stably attracted the targeted combination of consumer segments in the past. In at least one embodiment, prediction error is mitigated and feasibility in the planning of a new upcoming product is maintained.

While the attractiveness to different consumer segments significantly depends on the composition of features, it is important to consider that there are constraints related to the use of certain features, or to the joint use of them. In one likely scenario, it could be impossible to combine all product features recommended by the method of U.S. patent application Ser. No. 15/223,471 (now U.S. Pat. No. 10,448,120), due to a number of production-related constraints. Consider, as an example, concurrent events (1) and (2), and the production constraint (3): (1) a particular actor appears in half of the most attractive soap operas from the past; (2) a particular actress appears in the other half; (3) the particular actor and particular actress do not act together due to personal reasons. As a result, both features, although recommended, could not be used at the same time. To conclude, managing production constraints is an important challenge in order to ensure product feasibility.

Considering dynamic settings in which both consumption behavior and the proportional interests in consumer segments change rapidly, there is a need for planning new product on the fly. For instance, if a soap opera is divided into smaller pieces (i.e., chapters or episodes) that are planned on the fly. This dynamic nature poses a set of challenges typically involved in dynamic product planning.

As noted above, U.S. patent application Ser. No. 15/223, 471 (now U.S. Pat. No. 10,448,120), discloses a method for recommending features for new television content based on previous experiences and on investment interests from advertiser. Generally, in at least one embodiment, the disclosed method comprises the following steps:

(1) collecting information on how to prioritize different segments of consumers (e.g., by adding up all investment interests from advertisers);

(2) organizing data from past experiences regarding such prioritized segments (e.g., how different products performed in the past regarding each segment);

(3) using linear algebra to mine the products that were most effective in capturing that combination of targeted segments; and (4) ranking product features according to how frequent they are in the set of the most effective products so that features of new product can be selected.

While one or more embodiments of the present invention are described in the context of content planning, it is important to note that the present invention can be used in any context where multiple consumer segments have a chance of consuming the same product depending on its features, as would be apparent to a person of ordinary skill in the art.

Composition of Features for Heterogeneous Segments

One or more embodiments of the invention provide a method for the recommendation of product features to aid a given company in the planning of a new product, taking into consideration data regarding previously produced products; and a prioritization strategy regarding different consumer segments (e.g., women, men, children, different social classes, etc.). Such prioritization is materialized as weights that are assigned to each segment.

As discussed further below, weights can reflect the interest of commercial stakeholders on the segments, e.g., how much television advertisers are willing to invest on each of these segments. Alternatively, weights can reflect any other prioritization strategy, typically related to business goals.

Figure 1:
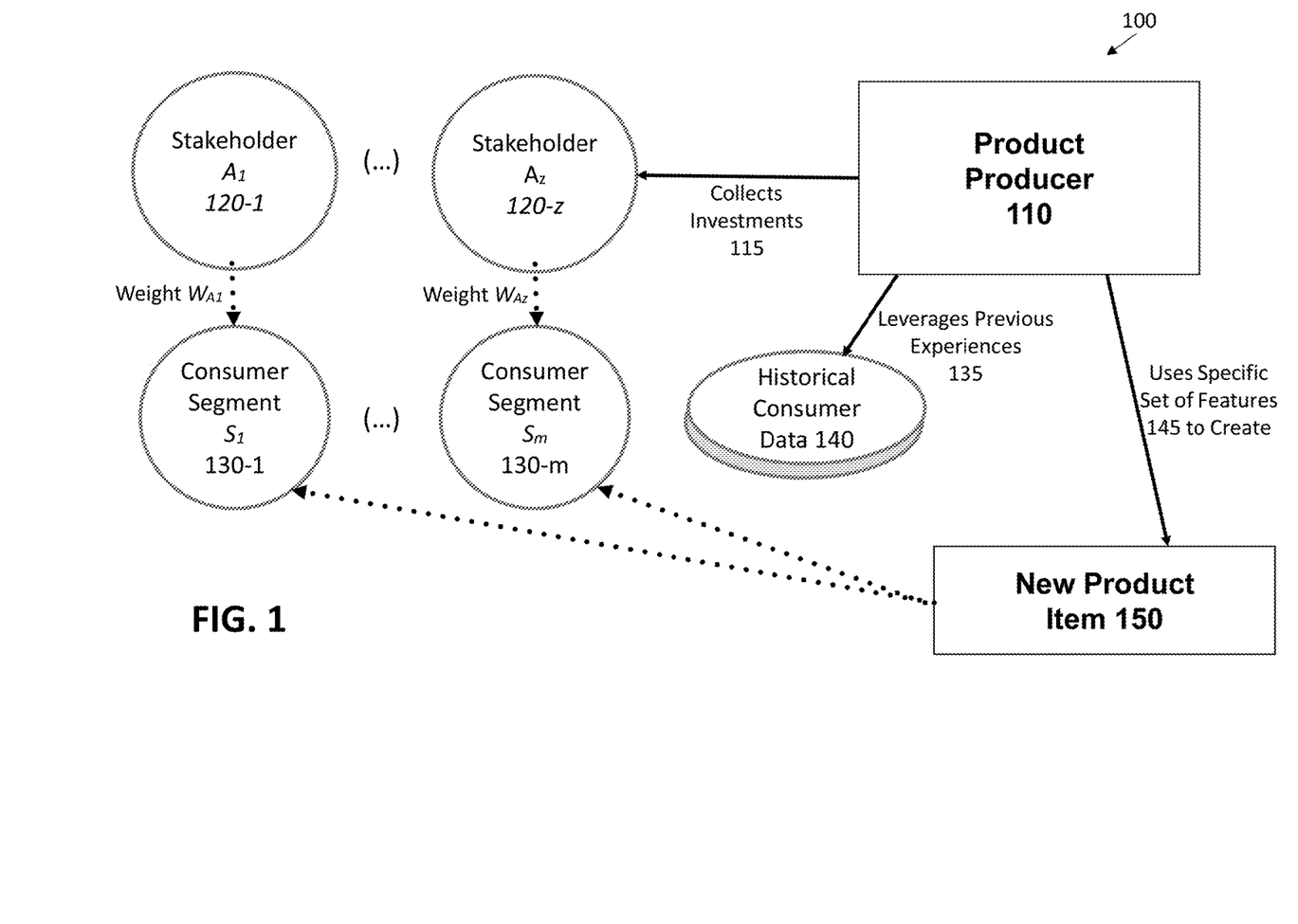
FIG. 1 illustrates an exemplary product planning method in accordance with an embodiment of the invention.

FIG. 1 illustrates an exemplary product planning method 100 in accordance with an embodiment of the invention. In the exemplary embodiment of FIG. 1, a product producer 110, such as a manufacturer or a television company, employs four exemplary resources to execute the method. As shown in FIG. 1, the exemplary product producer 110 performs investments surveys, to collect investments 115 for each stakeholder indicating an amount of money (or another weight metric) that a given stakeholder $A_1$ through $A_z$ (120-1 through 120-z) is willing to invest on each consumer segment $S_1$ through $S_m$ (130-1 through 130-m).

In addition, the product producer 110 collects and stores historical consumer data 140, potentially organized by consumer segments 130 or groups where stakeholders 120 could be willing to invest, in order to leverage previous experiences 135 of past product items and their attractiveness to stakeholders 120.

The exemplary product producer 110 uses a specific set of features 145 to create a new product item 150, such as a new widget or a new television program, customized to all considered stakeholders 120 and their preferred consumer segments 130. The specific set of features 145 are identified by one or more aspects of the present invention, as discussed further below.

Figure 2:
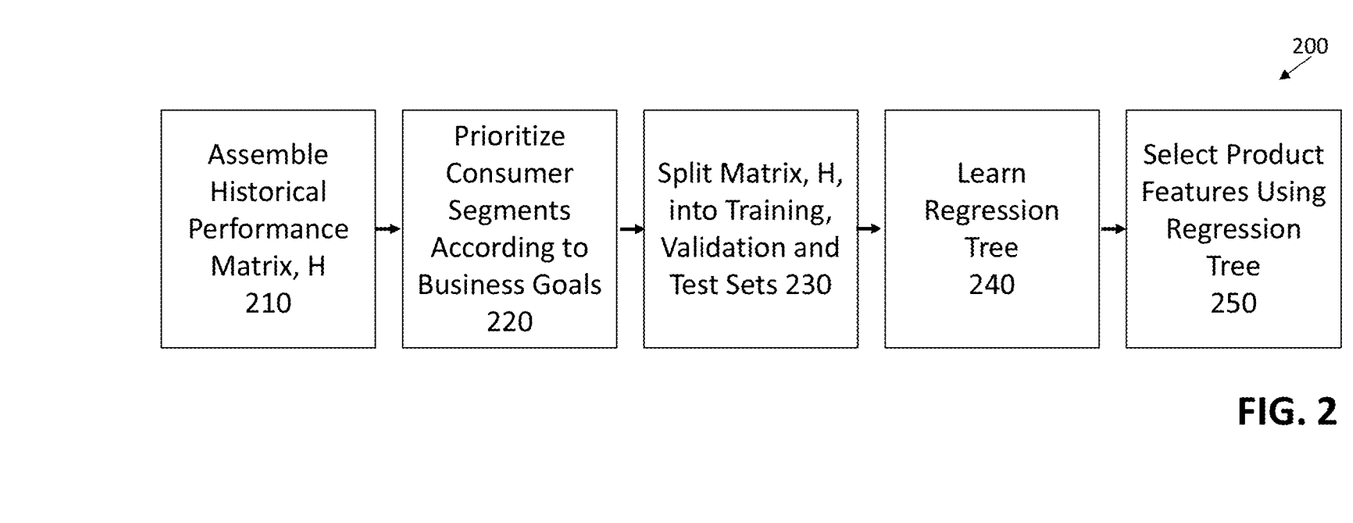
FIG. 2 is a flow chart illustrating an exemplary implementation of a product planning process, according to one embodiment of the invention.

FIG. 2 is a flow chart illustrating an exemplary implementation of a product planning process 200 according to one embodiment of the invention. Generally, the exemplary product planning process 200 identifies a desirable set of product features for new product item 150 based on the interests of stakeholders 120 and historical consumer data 140.

As shown in FIG. 2, a historical performance matrix, H, discussed further below in a section entitled "Assembling Historical Performances Matrix," is initially assembled during step 210 to describe the information contained in the historical consumer data 140 about the past performance of various product items.

The consumer segments are prioritized during step 220 according to business goals, as discussed further below in a section entitled "Combining Interests of Stakeholders," to construct a single vector containing one weight value for each consumer segment 130. This weight value could be directly obtained, for example, from an amount of money stakeholders 120 are willing to invest on a given consumer segment 130, as discussed below.

The historical performance matrix, H, is split during step 230 into training, validation and test sets, using the weights from step 220 as a target attribute. The training, validation and test sets are used during step 240 to learn a regression tree, as discussed further below in conjunction with FIG. 3. The regression tree provides a mechanism to predict the overall performance regarding the weighted combination of segments. It is noted that the prediction is performed as a function of the product features.

Finally, product features are selected during step 250, taking into account paths in the regression tree that satisfy user-defined criteria. Constraints that make specific paths invalid can also be considered.

In the case of products that are continuously planned (or re-planned) on the fly, multiple executions of the product planning process 200 of FIG. 2 might occur. This would be the case, for example, when either the weights assigned to each segment or the set of constraints on the features change over time.

Assembling Historical Performances Matrix (Step 210)

Consider the scenario in which a company C (e.g., product producer 110) has previously produced a set of products $P=\{P_1, P_2, \ldots, P_n\}$. In addition, consider that C has measured the performance, in terms of a metric, of all products in P with respect to different consumer segments $S=\{S_1, S_2, \ldots, S_m\}$. Therefore, in the first step (210) of the disclosed product planning process 200, the n×m matrix H is generated, shown below, in which each cell $H_{P_iS_j}$ gives a performance metric value for product $P_i$ with respect to segment $S_j$. For example, suppose that company C is a television company, product $P_1$ is a given movie and segment $S_1$ refers to the "women" audience segment. In this example, $H_{P_1S_1}$ would represent how successful movie $P_1$ is among women.

Matrix H has a size |P|×|S|, that is, n×m as in the following example:

$$H = \begin{bmatrix} H_{P_1S_1} & H_{P_1S_2} & H_{P_1S_3} & (...) & H_{P_1S_{m-1}} & H_{P_1S_m} \\ H_{P_2S_1} & H_{P_2S_2} & H_{P_2S_3} & (...) & H_{P_2S_{m-1}} & H_{P_2S_m} \\ H_{P_3S_1} & H_{P_3S_2} & H_{P_3S_3} & (...) & H_{P_3S_{m-1}} & H_{P_3S_m} \\ (...) & (...) & (...) & (...) & (...) & (...) \\ H_{P_{n-1}S_1} & H_{P_{n-1}S_2} & H_{P_{n-1}S_3} & (...) & H_{P_{n-1}S_{m-1}} & H_{P_{n-1}S_m} \\ H_{P_nS_1} & H_{P_nS_2} & H_{P_nS_3} & (...) & H_{P_nS_{m-1}} & H_{P_nS_m} \end{bmatrix}$$

A given product performance could be assessed, for example, by means of an average performance measured for a particular product item. It is noted that the present examples should not limit the ways by which consumers can be segmented, nor the means by which performance of a given product item can be measured. For more information on the processing of matrices, vectors and linear models, see, for example, C. M. Bishop, "Pattern Recognition and Machine Learning," (Springer, 2013; ISBN 978-8132209065).

Combining Interests of Stakeholders to Weight Segments (Step 220)

The way to assign weights to consumer segments might vary depending on the industry and the type of product to be planned. In the case when products are sold directly to customers, the anticipated addressable market of each customer segment is a good candidate. In the case of a television broadcaster, the amount of money each advertiser is willing to invest in each segment can be seen as a sensible way for weighting the segments.

Consider a scenario in which a television company C has a set of major advertisers $A=\{A_1, A_2, \ldots, A_o\}$, for which C is able to gather information about their targeted consumer (audience) segments in S and how much they are willing to invest in each of these targets.

Additionally, suppose that advertiser (stakeholder) $A_1$ plans to invest 10 units of capital in segment $S_1$, 50 units of capital in segment $S_2$, and nothing in other segments. The preferential investment, $I_{A1}$, of advertiser (stakeholder) $A_1$ can be established, as follows:

$I_{A1}=<10, 50, 0, \ldots, 0>$.

where the j-th element in vector $I_{A1}$ represents a given amount to be invested in segment $S_j$.

Additionally, suppose that advertiser (stakeholder) $A_2$ plans to invest 40 units of capital in segment $S_2$, 60 units in segment $S_3$, and nothing in the other segments. The preferential investment, $I_{A2}$, of advertiser (stakeholder) $A_2$ can be established, as follows:

$I_{A2}=<0, 40, 60, \ldots, 0>$.

With such a framework in mind, it is possible to summarize all information gathered by company C regarding advertisers in A by making the sum of all investment vectors. In general terms, C has an overall combined target, $T_C$, as follows:

$T_C = \Sigma I_\alpha, \forall \alpha \in A$.

In the illustrated case of preferential investments $I_{A1}$ and $I_{A2}$, $T_C$ is defined as follows:

$I_{A1}=<10, 50, 0, \ldots, 0>$;

$I_{A2}=<0, 40, 60, \ldots, 0>$;

$T_C=<10+0, 50+40, 0+60, \ldots, 0> \therefore T_C=<10, 90, 60, \ldots, 0>$.

Generally, the projected overall combined target, $T_C$, (e.g., a budget) ranks consumer segments 130 based on the expected advertising spending of the stakeholders (e.g., advertisers).

Considering the combined target, $T_C$, as a means of weighting all consumer segments, the dot product between the combined target, $T_C$, and each row i in the matrix H results in an alignment metric for each Product $P_i$ in P, as follows:

$V_i = H[i] \cdot T_C$.

In this manner, a weighted performance metric, $V_i$, is computed for each product item, by calculating the dot product between the weights for the various consumer segments, embodied in the combined target, $T_C$, and respective preferences of the various consumer segments in H.

It is noted that products with high performance values with respect to the segments with larger weights will be associated with higher total performance metric, $V_i$, values. More precisely, features of products that are associated with high V values are good candidates for being taken into consideration when planning a new product for specific combinations of consumer segments. One goal of the next two steps is to learn a regression tree that highlights the most attractive ones.

Assembling Training, Validation, and Test Matrices for Regression Tree (Step 230)

After calculating the weighted performance value $V_i$ for each product $P_i$, a new matrix M is assembled in the following way. Each product $P_i$, described by its features $F=\{F_1, F_2, \ldots, F_k\}$ along with its corresponding weighted performance value $V_i$ will become a row in M, as follows:

$$M = \begin{bmatrix} F_1 & F_2 & F_5 & (...) & F_k & V_1 \\ F_2 & F_7 & F_4 & (...) & F_5 & V_2 \\ F_3 & F_2 & F_5 & (...) & F_8 & V_3 \\ (...) & (...) & (...) & (...) & (...) & (...) \\ F_1 & F_2 & F_4 & (...) & F_7 & V_{n-1} \\ F_1 & F_k & F_5 & (...) & F_3 & V_n \end{bmatrix}$$

In one or more embodiments, M is split into three different matrices in order to learn a regression tree: (i) a given number of rows (depending on the problem in question) will serve as the training set for a regression tree learner, (ii) another smaller number of rows will form the validation set, and (iii) the remaining rows will work as the test set. That is, a hold-out validation is performed as in a traditional Machine Learning workflow, in order to control overfitting. The last column of the matrices (weighted performance values, V) will be regarded as the target attribute, that is, the value that will be predicted by the regression tree to be learned in step 240.

Learning Regression Tree (Step 240)

After splitting matrix M into three matrices during step 230, a regression tree is learned during step 240 from the training set. Generally, a traditional Machine Learning workflow is followed. The resultant regression tree will be composed of test conditions (internal nodes) on features belonging to previously produced products, as discussed further below in conjunction with FIG. 3.

Regression Trees Overview

Due to the advances in data collection and storage, huge online archives of data are currently available in many organizations, and these archives may contain yet unknown useful information (i.e., interpretable information). A direct consequence of this is that the field of Machine Learning has become very popular in the Digital Age, since its aim is to automatically discover useful information in (large) databases.

Machine Learning tasks are commonly distinguished into two main categories, namely predictive tasks and descriptive tasks. Predictive tasks use the values of some of the available attributes in order to predict unknown or future values of a specific attribute (which is often called the target). Based on an input dataset, a model is learned for the target attribute as a function of the other ones. In general, the goal is to learn a model with a low prediction error, that is, in which the error between the predicted and true values of the target attribute is minimized. Classification and regression are two examples of predictive tasks. Descriptive tasks, on the other hand, focus on extracting interesting relationships, patterns or trends that better describe the data. Two popular tasks in this category are association rules and cluster analysis.

In the present context, predictive tasks are of interest, and more specifically, regression. For this task, a model is built so as to predict a continuous attribute (target attribute), based on the values of the other attributes. An example of a regression model is a regression tree.

As an illustration, suppose a data table of television soap operas is given, where the attributes are the characteristics (features) of these soap operas, such as year, start time, end time, attributes related to the actors and to the story lines themselves, and the (average) rating given by the audience. Consider this data table as the training set, that is, the dataset from which the regression tree is to be learned, and its attribute rating as the target attribute to be predicted.

Figure 3:
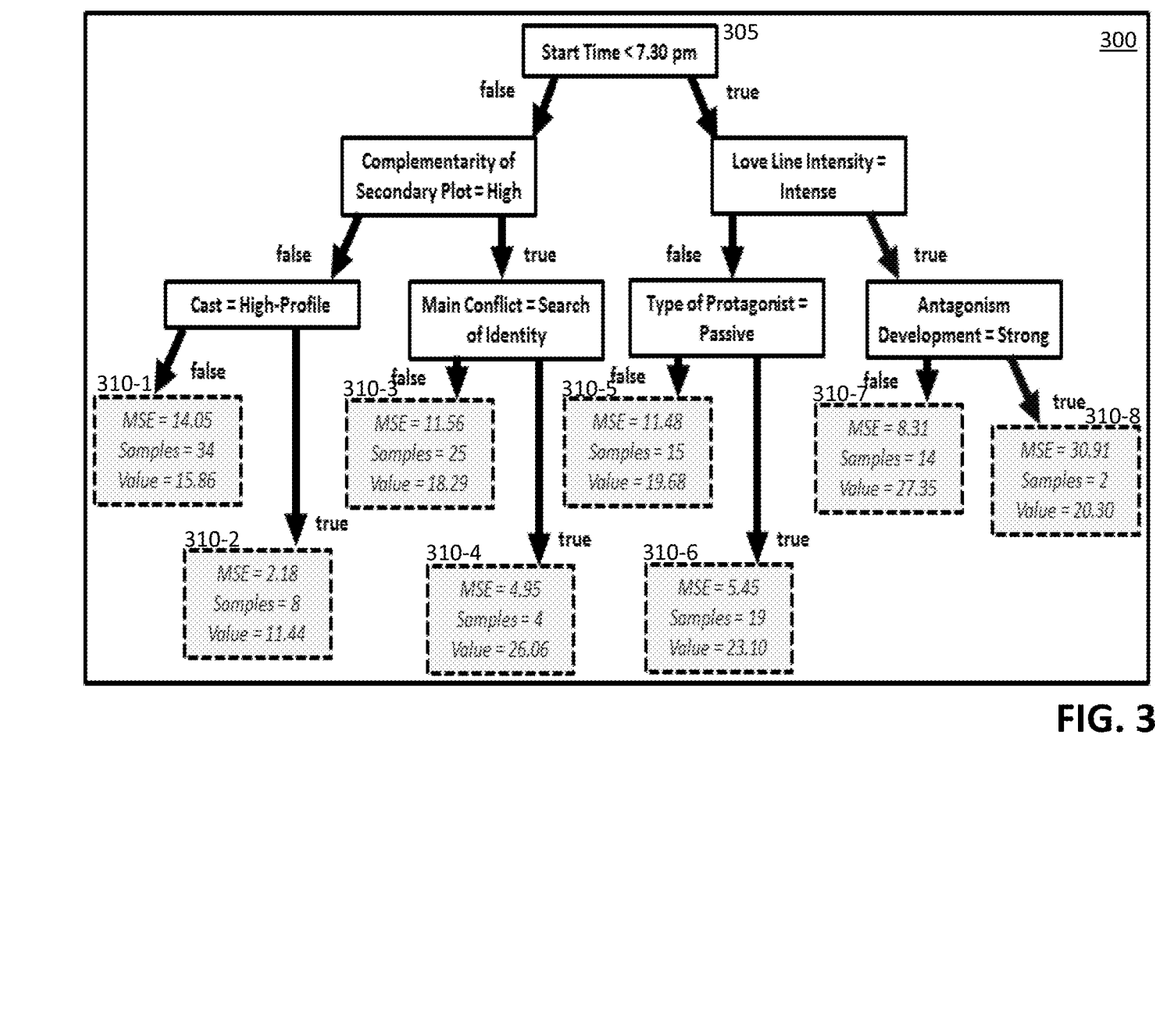
FIG. 3 illustrates an exemplary regression tree learned to predict a predefined target attribute as a function of features of an exemplary soap opera, in at least one embodiment of the invention.

FIG. 3 illustrates an exemplary regression tree 300 learned to predict the predefined target attribute (i.e., the rating) as a function of the soap opera's features. The exemplary regression tree 300 is comprised of a root node 305, a plurality of internal nodes, and a plurality of leaf nodes 310-1 through 310-8 (e.g., rectangles with dashed lines at the bottom of the tree 300). Note that each path in the regression tree 300 can be seen as a composition of test conditions (if-then statements) on product features. Each path p down the tree is associated to a weighted performance value. In other words, given a path p, the features highlighted by each path lead to a weighted performance value represented by the corresponding leaf node 310.

The internal nodes (including the root node 305) contain the attribute test conditions that separate the soap operas in the training set according to different features. Each of the leaf nodes 310-1 through 310-8 is assigned a continuous value (the number after the term 'value'), which is the predicted rating value: it is computed as the mean rating of the soap operas in the training set that satisfy the test conditions from the root to the corresponding leaf. Moreover, in each leaf node 310, the number after the term 'samples' gives the number of soap operas in the training set satisfying the test conditions along the corresponding path, while the number after the term 'mse' (mean squared error) gives the prediction error. Generally speaking, the prediction error can be seen as a measure of how far the predicted rating value is from the real rating values.

With the illustrative regression tree 300, one can predict the rating value of a new soap opera. Starting from the root, the attribute test condition is applied to the new soap opera and the appropriate path is followed. This leads to either an internal node or to a leaf node 310. In the former case, a new test is applied, while, in the latter case, the rating value associated to the corresponding leaf node 310 is finally assigned to the target attribute.

To learn a regression tree, such as regression tree 300, one may implement a regression tree learner from scratch or simply use any of the available machine learning toolkits, such as scikit learn, which comprises a set of machine learning algorithms implemented in Python™. A traditional Machine Learning workflow is as follows. The available data is split into three data sets, namely training, validation, and test sets. The training set, as already mentioned, is the input data for the regression tree learner. The learner finds the best attribute test conditions that separates the rows in the training set, as in a greedy algorithm. As with other machine learning algorithms, the goal is to learn a regression tree that is going to perform well (that is, with a low prediction error) on rows that were not considered during the learning phase. To this end, the learned tree must not be overfitted, that is, it must not perform excellently when considering only the rows in the training set and poorly when considering the rows in the validation set. That is when the validation set comes into play. It is used to avoid overfitting by helping the data analyst to find the best hyperparameters to be considered during the learning phase, such as the maximum number of attribute test conditions. Finally, the role of the test set is to assure good performance on rows that were not taken into account during the learning phase nor during the validation phase.

Select Product Features Using Regression Tree (Step 250)

Finally, with the regression tree 300 in hand, the regression tree 300 can be traversed in several ways in order to find an attractive composition of features (such as the most attractive composition) (with respect to the stakeholders and their target segments) to be considered in the planning of a new product.

Figure 4:
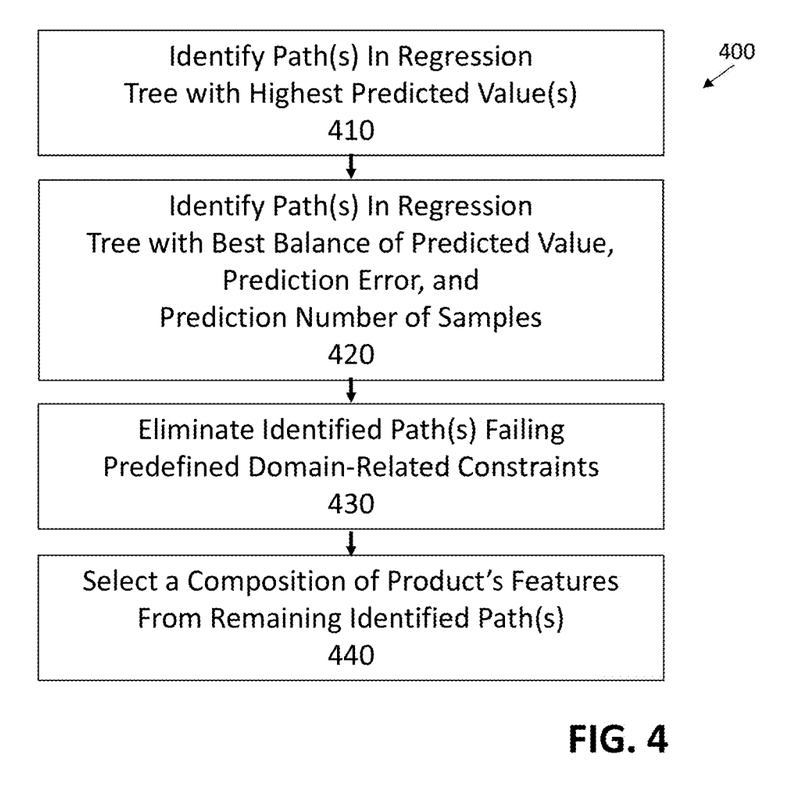
FIG. 4 is a flow chart illustrating an exemplary implementation of a regression tree-based product feature selection process, according to one embodiment of the invention.

FIG. 4 is a flow chart illustrating an exemplary implementation of a regression tree-based product feature selection process 400 according to one embodiment of the invention. As shown in FIG. 4, the exemplary regression tree-based product feature selection process 400 initially identifies one or more paths during step 410 that leads to the leaf node 310 corresponding to the highest predicted value (term 'value' in the leaf nodes 310 of the regression tree 300 in FIG. 3). Such a path will contain the composition of features that a new product must have in order to better satisfy all major stakeholders. In the regression tree 300 of FIG. 3, the path that leads to the highest value is the one with the leaf node number 310-7 (where the highest value is 27.35).

Considering the regression tree 300 of FIG. 3 as an example, the highest predicted value leaf node from step 410 may not have a satisfactory value for 'mse' (mean squared error) or 'samples' (number of previously produced products that are considered by the corresponding leaf). Thus, the exemplary regression tree-based product feature selection process 400 identifies one or more paths during step 420 that give the best balance between 'mse', 'samples', and 'value'. In the example of FIG. 3, the path that leads to leaf node 310-6 would be a good choice.

If the leaf node identified with the highest value from step 410 (or the most suitable according to the user) has a composition of features that do not satisfy predefined domain-related constraints, such as constraints of the company (e.g., start time does not match the plans of the company), these non-compliant paths can be eliminated from consideration during step 430 and other paths should be taken into consideration (e.g., towards leaf node 310-4 in FIG. 3).

Finally, a composition of features for the product is selected during step 440 from the remaining identified path(s).

EXAMPLES

As noted above, while one or more embodiments of the present invention are described in the context of content planning in the context of a television company, it is important to note that the present invention can be used in any context where multiple consumer segments have a chance of consuming the same product depending on its features, as would be apparent to a person of ordinary skill in the art. The following examples were primarily generated using real data from a particular player in the television industry (segmented audience data and the characteristics of approximately 170 soap operas and 800 movies).

Traversing Regression Tree in Context of Planning a New Soap Opera

This example leverages the aforementioned real data in the scope of the 170 soap operas. Suppose that a particular television player is interested in planning a new soap opera and its major advertisers are satisfied only if such soap opera attracts both women and children segments, being equally weighted.

With reference to the regression tree 300 of FIG. 3, the path in the tree 300 that leads to the highest 'value' (leaf number 310-7) has the composition of features 'start time <7:30' and 'love line intensity=Intense' and 'Antagonism Development=NOT Strong'. This composition can be regarded as the most important features a new soap opera must have in order to satisfy the interests of all advertisers.

Now suppose that the company in question finds that such best path has poor values for 'mse' and/or 'samples'. In this case, the company can look for another path that gives the best balance between 'mse', 'samples', and 'value'. Note that the path leading to a leaf with 'value=23.10' (leaf node 310-6) would be an option: although leaf node 310-6 has a lower 'value' than the best path (leaf node 310-7), leaf node 310-6 has a higher value for 'samples' and a lower value for 'mse'. In this case, an attractive composition of features would be 'start time <7:30', 'love line intensity=NOT Intense', and 'Type of Protagonist=Passive'.

Finally, consider that the new soap opera must be broadcast before 7:30, that is, the company has a time constraint. With this constraint in mind, one may look for good paths on the left side of the root node 305. The path that leads to the leaf node 310-4 would be a good candidate.

Comparing Regression Trees Targeting Segments in Context of Soap Opera Planning

Figure 5:
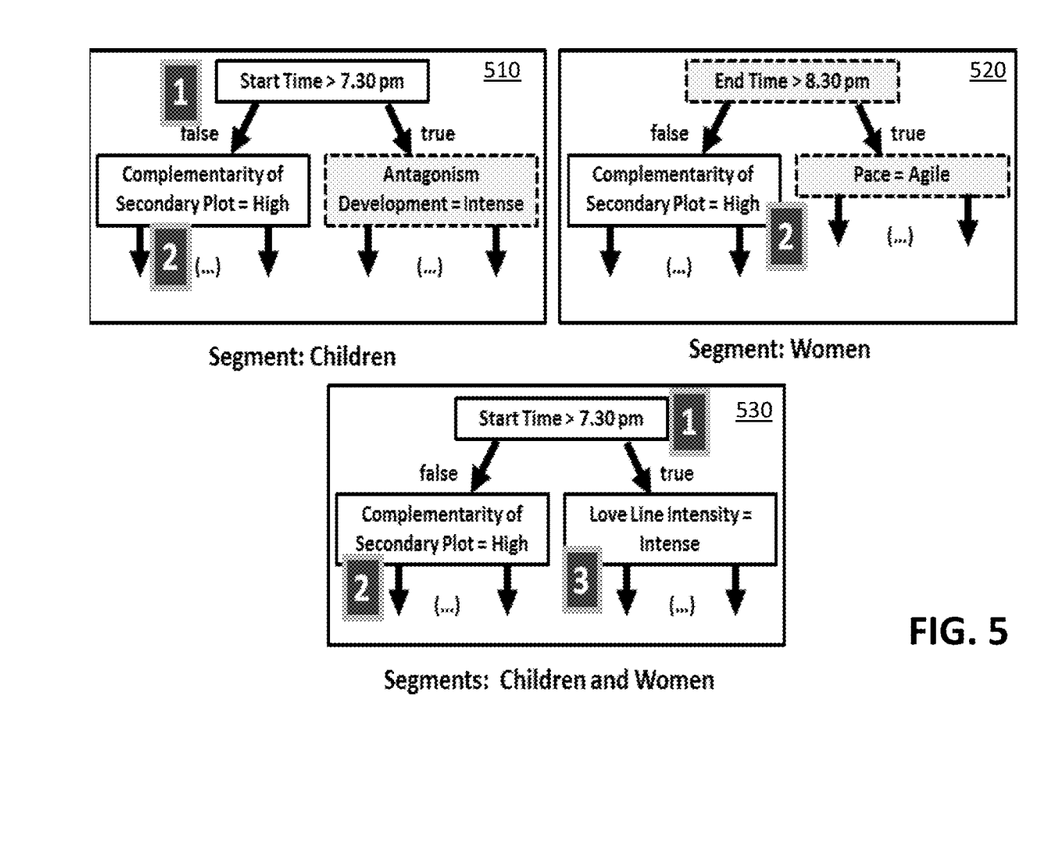
FIG. 5 illustrates top levels of a number of different regression trees targeting different consumer segments.

Again, in the domain of soap operas, FIG. 5 illustrates the top two levels of three different regression trees 510, 520, 530 targeting children (upper left), women (upper right), and children plus women (bottom), respectively. A few characteristics of these trees 510, 520, 530 are worthy of attention. With respect to the square label [1] in trees 510 and 530 of FIG. 5, the root decision when planning a soap opera targeting children (and children and women) is whether the program starts before or after 7.30 pm. Likewise, for the regression tree 520 when the target is on women, the root decision is whether the program ends before or after 8.30 pm.

With respect to the square label [2] in trees 510, 520 of FIG. 5, deciding over the complementarily of the secondary plot of a soap opera seems relevant to both children and women, and this is reflected in the resultant combined tree 530 for children and women.

With respect to the square label [3] in tree 530 of FIG. 5, the love line intensity is not relevant until both segments (children and women) are put jointly into consideration. This characteristic is particularly interesting because it shows, with only the top two levels of these regression trees 510, 520, 530, how intricate the planning process typically is when combining multiple segments. Making the right data-driven decisions could lead to far better results for the soap opera production industry.

Applying Business Constraints when Choosing Features for Movies

This example leverages the aforementioned real data in the scope of the 800 movies. Suppose that the particular television player is interested in purchasing new movies and, due to commercial and strategic reasons, its major advertisers are satisfied only if movies attract children. Therefore, movie purchases are meant for this particular segment.

Figure 6:
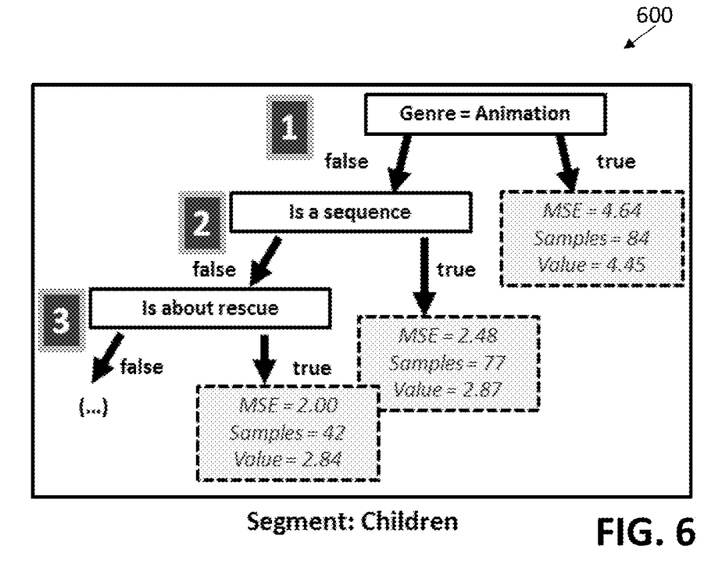
FIG. 6 illustrates top levels from an exemplary regression tree targeting children, for an exemplary television company that plans to purchase licenses for broadcasting movies.

Following the steps in the disclosed product planning process 200, the regression tree is learned. FIG. 6 illustrates the top three levels from a regression tree 600 targeting children, for an exemplary television company that plans to purchase the licenses for broadcasting movies. A few characteristics of the regression tree 600 are worthy of attention.

With respect to the square label [1] in the regression tree 600 of FIG. 6, as the root decision, the resultant tree 600 considers whether the movies should be animations.

With respect to the square label [2] in the regression tree 600 of FIG. 6, suppose that the company is not interested in animations since they are very expensive; then, purchasing sequences seems to be a good decision.

With respect to the square label [3] in the regression tree 600 of FIG. 6, if sequences are not a good option due to the fact that they are, e.g., not available in the catalogue, the company might consider purchasing movies involving the rescue of a character. Note that, in this case, the company is applying business constraints: if animations are very expensive and sequences are not available in the catalogue, the disclosed method gives the company the ability to look for another path in the same regression tree 600. In other words, without the need of re-learning a regression tree, the company can consider any production-related constraints, or even business constraints, in order to make feasible decisions.

Dynamic Composition of Features for Creation of Products on the Fly

This particular example elaborates on different aspects that could optionally be built on top of the disclosed method. Instead of selecting features for a soap opera as a whole, the disclosed method could also work on the selection of features for the next chapter of the soap opera. Features could correspond to levels of emotions like love and suspense, the emphasis on specific subplots or the rhythm of the story. Audience of the soap opera and the advertisers might vary and, consequently, the interest in attracting specific consumer segments might also vary. In this case, regression trees could be learned on the fly so that the most attractive compositions of features could be selected.

Additional constraints related to the current state of the story could be added. In principle, stories need to make sense and the variation of emotional states are important to catch the attention of the audience. It is then necessary to represent features regarding the current state of the story at the previous chapter. Such states are mandatory features that constrain the paths of the regression trees eligible to selection. For instance, after a chapter in which the hero is hurt, it might be necessary to keep some level of suspense limiting the actions that could occur. In this case, the disclosed method could force the choice of the best coherent path that takes into account the need of keeping the level of suspense.

Dynamic generation of chapters using this method would resort to the continuous learning of new regression trees using, as historical data, all information available about previous chapters of all previous soap operas.

Conclusion

One or more embodiments of the invention provide product planning methods and apparatus that recommend product features based on the investment interest of stakeholders in various consumer segments and historical consumer preferences. In at least one embodiment, the disclosed product planning methods and apparatus combine interests from multiple stakeholders and intelligently use such combination to mine past performance data. One or more embodiments of the invention employ on-demand learning of regression trees to explain how compositions of features lead to diverse performance values when considering different weights for heterogeneous consumer segments. The hierarchical organization of product features, as given by the regression trees, provides more comprehensive and ready-to-use insights that are helpful to the product planning process.

The foregoing applications and associated embodiments should be considered as illustrative only, and numerous other embodiments can be configured using the techniques disclosed herein, in a wide variety of different applications.

It should also be understood that the product planning techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed product planning techniques may be implemented using one or more processing platforms. One or more of the processing modules or other components may therefore each run on a computer, storage device or other processing platform element. A given such element may be viewed as an example of what is more generally referred to herein as a "processing device."

Figure 7:
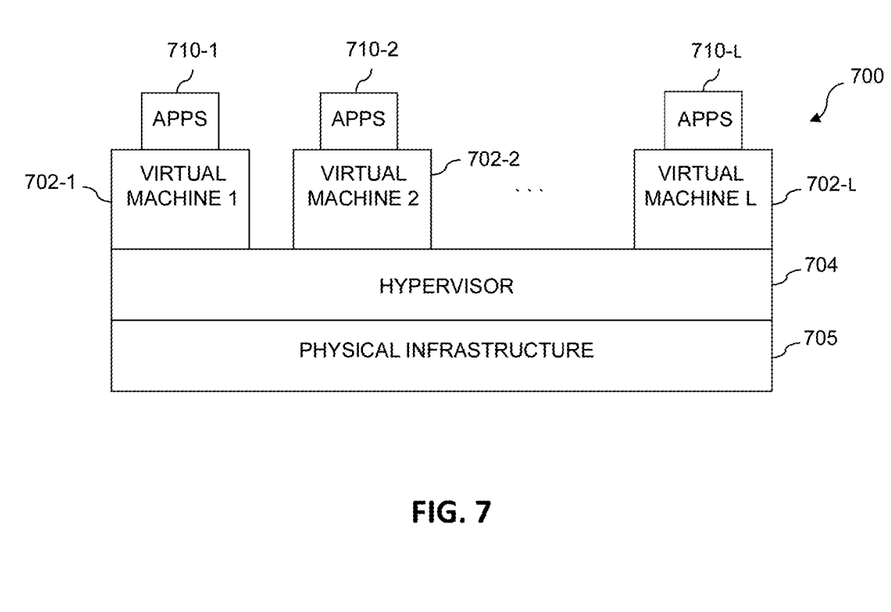
FIG. 7 illustrates an exemplary processing platform that may be used to implement at least a portion of one or more embodiments of the invention comprising a cloud infrastructure.

Referring now to FIG. 7, one possible processing platform that may be used to implement at least a portion of one or more embodiments of the invention comprises cloud infrastructure 700. The cloud infrastructure 700 in this exemplary processing platform comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

The cloud infrastructure 700 may encompass the entire given system or only portions of that given system, such as one or more of client, servers, controllers, or computing devices in the system.

Although only a single hypervisor 704 is shown in the embodiment of FIG. 7, the system may of course include multiple hypervisors each providing a set of virtual machines using at least one underlying physical machine.

An example of a commercially available hypervisor platform that may be used to implement hypervisor 704 and possibly other portions of the system in one or more embodiments of the invention is the VMware™ vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

Figure 8:
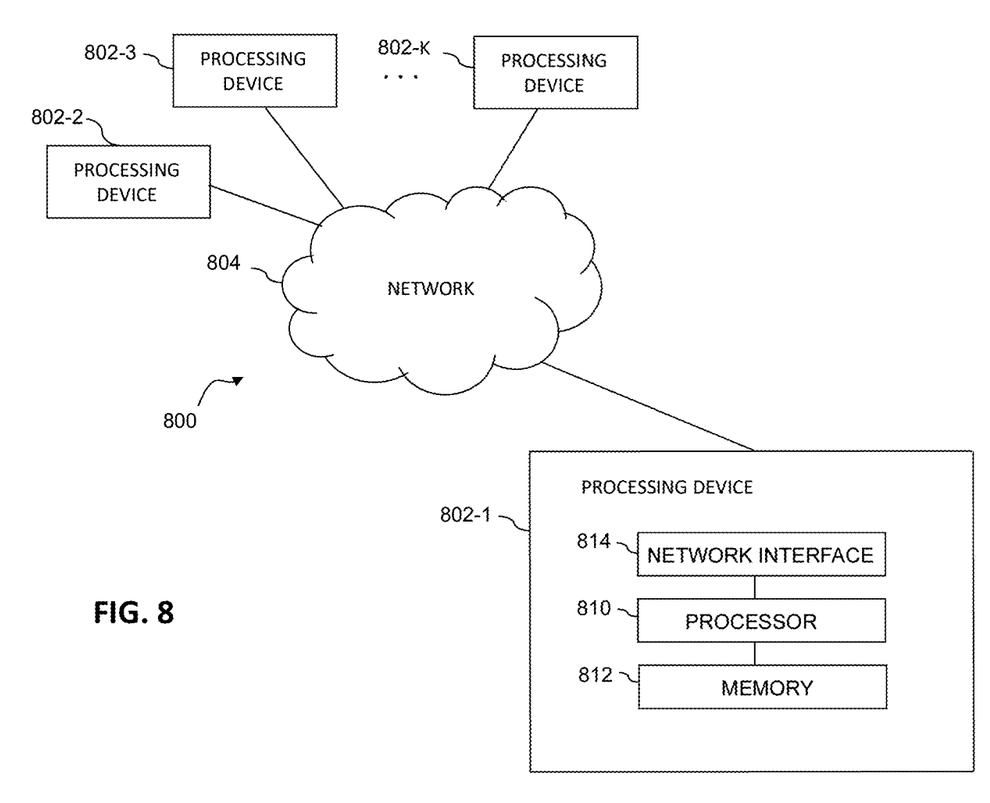
FIG. 8 illustrates another exemplary processing platform that may be used to implement at least a portion of one or more embodiments of the invention.

Another example of a processing platform is processing platform 800 shown in FIG. 8. The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "computer program product" having executable computer program code embodied therein, may comprise random access memory (RAM), read only memory (ROM) or other types of memory, in any combination.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 7 or 8, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

Also, it should again be emphasized that the above-described embodiments of the invention are presented for purposes of illustration only. Many variations and other alternative embodiments may be used. For example, the disclosed techniques are applicable to a wide variety of other types of communication systems, storage systems and processing devices. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising the steps of:
    obtaining historical consumer data comprising product preferences for a plurality of existing product items for a plurality of consumer segments, wherein said product preferences comprise at least one performance metric for each product item and consumer segment pair;
    obtaining, for each of said plurality of existing product items, a plurality of product features indicating characteristics of a corresponding product item;
    prioritizing a plurality of said consumer segments by obtaining a weight, for each of a plurality of said consumer segments, indicating an interest in a given consumer segment, wherein a given weight indicates a prioritization of a corresponding consumer segment by one or more stakeholders;
    computing, using at least one processing device, a total performance metric, for each product item, by calculating a dot product between said weights for said plurality of consumer segments and respective preferences of said plurality of consumer segments regarding a given product item;
    obtaining a trained regression tree generated from the existing product items to predict said total performance metric in terms of corresponding product features, wherein the trained regression tree predicts the total performance metric as a target attribute;
    the trained regression tree being trained by a regression tree learner applied to a training data set, wherein the training data set comprises, for each product item in the training data set, at least some of the product features indicating characteristics of the respective product item and the total performance metric for the respective product item as the target attribute for the trained regression tree, wherein the regression tree learner trains the trained regression tree by (i) finding a set of attribute test conditions, using a machine learning toolkit comprising one or more machine learning algorithms, (ii) separating the training data for the product items according to different features using the set of attribute test conditions, (iii) obtaining a validation data set to control performance of the trained regression tree for product items not in the training data set, and (iv) determining one or more parameters to be considered during the training of the trained regression tree, wherein the validation data set comprises, for each product item in the validation data set, at least some of the product features indicating characteristics of the respective product item and the total performance metric for the respective product item;
    selecting, using at least one processing device, a combination of said product features to be used to plan one or more new product items based on one or more identified paths in said trained regression tree that satisfy one or more predefined domain-related constraints; and
    initiating a production of said one or more new product items comprising said combination of said product features after said selecting.

2. The method of claim 1, wherein said one or more identified paths in said trained regression tree comprise a path having a leaf node with a substantially highest predicted value.

3. The method of claim 1, wherein said one or more identified paths in said trained regression tree comprise one or more paths having a balance of one or more of predicted value, prediction error, and prediction number of samples, which satisfies one or more predefined criteria.

4. The method of claim 1, further comprising the step of removing one or more paths in said trained regression tree from said one or more identified paths that fail the one or more predefined domain-related constraints.

5. The method of claim 1, wherein said performance metric comprises an average rating measured for a particular product item.

6. The method of claim 1, wherein said prioritization weight is based on amounts of money one or more stakeholders expect to spend on targeting each of said plurality of consumer segments.

7. The method of claim 1, wherein said prioritization weight is based on a potential market estimation for each of said plurality of consumer segments.

8. The method of claim 1, wherein a given new product item comprises a plurality of components over time and wherein said method is separately applied to one or more components of said given new product item.

9. The method of claim 8, wherein said method is dynamically applied to a given one of said one or more components of said given new product item as said given one component is generated.

10. The method of claim 8, further comprising the step of applying one or more constraints to said given one component based on one or more prior components.

11. A computer program product, comprising a non-transitory machine-readable storage medium having encoded therein executable code of one or more software programs, wherein the one or more software programs when executed by at least one processing device perform the following steps:

obtaining historical consumer data comprising product preferences for a plurality of existing product items for a plurality of consumer segments, wherein said product preferences comprise at least one performance metric for each product item and consumer segment pair;

obtaining, for each of said plurality of existing product items, a plurality of product features indicating characteristics of a corresponding product item;

prioritizing a plurality of said consumer segments by obtaining a weight, for each of a plurality of said consumer segments, indicating an interest in a given consumer segment, wherein a given weight indicates a prioritization of a corresponding consumer segment by one or more stakeholders;

computing, using at least one processing device, a total performance metric, for each product item, by calculating a dot product between said weights for said plurality of consumer segments and respective preferences of said plurality of consumer segments regarding a given product item;

obtaining a trained regression tree generated from the existing product items to predict said total performance metric in terms of corresponding product features, wherein the trained regression tree predicts the total performance metric as a target attribute;

the trained regression tree being trained by a regression tree learner applied to a training data set, wherein the training data set comprises, for each product item in the training data set, at least some of the product features indicating characteristics of the respective product item and the total performance metric for the respective product item as the target attribute for the trained regression tree, wherein the regression tree learner trains the trained regression tree by (i) finding a set of attribute test conditions, using a machine learning toolkit comprising one or more machine learning algorithms, (ii) separating the training data for the product items according to different features using the set of attribute test conditions, (iii) obtaining a validation data set to control performance of the trained regression tree for product items not in the training data set, and (iv) determining one or more parameters to be considered during the training of the trained regression tree, wherein the validation data set comprises, for each product item in the validation data set, at least some of the product features indicating characteristics of the respective product item and the total performance metric for the respective product item;

selecting, using at least one processing device, a combination of said product features to be used to plan one or more new product items based on one or more identified paths in said trained regression tree that satisfy one or more predefined domain-related constraints; and initiating a production of said one or more new product items comprising said combination of said product features after said selecting.

12. The computer program product of claim 11, wherein said one or more identified paths in said trained regression tree comprise one or more of a path having a leaf node with a substantially highest predicted value and one or more paths having a balance of one or more of predicted value, prediction error, and prediction number of samples, which satisfies one or more predefined criteria.

13. The computer program product of claim 11, further comprising the step of removing one or more paths in said trained regression tree from said one or more identified paths that fail the one or more predefined domain-related constraints.

14. The computer program product of claim 11, wherein said prioritization weight is based on one or more of amounts of money one or more stakeholders expect to spend on targeting each of said plurality of consumer segments and a potential market estimation for each of said plurality of consumer segments.

15. The computer program product of claim 11, wherein a given new product item comprises a plurality of components over time and wherein said steps are separately applied to one or more components of said new product item.

16. A system, comprising:
a memory; and
at least one processing device, coupled to the memory, operative to implement the following steps:

obtaining historical consumer data comprising product preferences for a plurality of existing product items for a plurality of consumer segments, wherein said product preferences comprise at least one performance metric for each product item and consumer segment pair;

obtaining, for each of said plurality of existing product items, a plurality of product features indicating characteristics of a corresponding product item;

prioritizing a plurality of said consumer segments by obtaining a weight, for each of a plurality of said consumer segments, indicating an interest in a given consumer segment, wherein a given weight indicates a prioritization of a corresponding consumer segment by one or more stakeholders;

computing, using at least one processing device, a total performance metric, for each product item, by calculating a dot product between said weights for said plurality of consumer segments and respective preferences of said plurality of consumer segments regarding a given product item;

obtaining a trained regression tree generated from the existing product items to predict said total performance metric in terms of corresponding product features, wherein the trained regression tree predicts the total performance metric as a target attribute;

the trained regression tree being trained by a regression tree learner applied to a training data set, wherein the training data set comprises, for each product item in the training data set, at least some of the product features indicating characteristics of the respective product item and the total performance metric for the respective product item as the target attribute for the trained regression tree, wherein the regression tree learner trains the trained regression tree by (i) finding a set of attribute test conditions, using a machine learning toolkit comprising one or more machine learning algorithms, (ii) separating the training data for the product items according to different features using the set of attribute test conditions, (iii) obtaining a validation data set to control performance of the trained regression tree for product items not in the training data set, and (iv) determining one or more parameters to be considered during the training of the trained regression tree, wherein the validation data set comprises, for each product item in the validation data set, at least some of the product features indicating characteristics of the respective product item and the total performance metric for the respective product item;

selecting, using at least one processing device, a combination of said product features to be used to plan one or more new product items based on one or more identified paths in said trained regression tree that satisfy one or more predefined domain-related constraints; and initiating a production of said one or more new product items comprising said combination of said product features after said selecting.

17. The system of claim 16, wherein said one or more identified paths in said trained regression tree comprise one or more of a path having a leaf node with a substantially highest predicted value and one or more paths having a balance of one or more of predicted value, prediction error, and prediction number of samples, which satisfies one or more predefined criteria.

18. The system of claim 16, further comprising the step of removing one or more paths in said trained regression tree from said one or more identified paths that fail the one or more predefined domain-related constraints.

19. The system of claim 16, wherein said prioritization weight is based on one or more of amounts of money one or more stakeholders expect to spend on targeting each of said plurality of consumer segments and a potential market estimation for each of said plurality of consumer segments.

20. The method of claim 1, wherein said one or more determined parameters comprise a maximum number of the attribute test conditions.

\* \* \* \* \*

UNITED STATES PATENT AND TRADEMARK OFFICE
CERTIFICATE OF CORRECTION

| | |
|---|---|
| PATENT NO. | : 11,030,667 B1 |
| APPLICATION NO. | : 15/338617 |
| DATED | : June 8, 2021 |
| INVENTOR(S) | : Adriana B. Prado et al. |

It is certified that error appears in the above-identified patent and that said Letters Patent is hereby corrected as shown below:

On the Title Page

Please delete the Title Page and insert the Title Page showing the corrected illustrative figure shown on the attached page.

In the Drawings

Please replace Figs. 1-8 with Figs. 1-8 as shown on the attached pages.

Signed and Sealed this
Ninth Day of August, 2022

Katherine Kelly Vidal
*Director of the United States Patent and Trademark Office*

(12) United States Patent
Prado et al.

(10) Patent No.: US 11,030,667 B1
(45) Date of Patent: Jun. 8, 2021

(54) METHOD, MEDIUM, AND SYSTEM FOR RECOMMENDING COMPOSITIONS OF PRODUCT FEATURES USING REGRESSION TREES

(71) Applicant: EMC IP Holding Company LLC, Hopkinton, MA (US)

(72) Inventors: Adriana Bechara Prado, Rio de Janeiro (BR); Victor Bursztyn, Rio de Janeiro (BR); Jonas F. Dias, Rio de Janeiro (BR); André de Almeida Maximo, Rio de Janeiro (BR); Angelo E. M. Ciarlini, Rio de Janeiro (BR)

(73) Assignee: EMC IP Holding Company LLC, Hopkinton, MA (US)

(*) Notice: Subject to any disclaimer, the term of this patent is extended or adjusted under 35 U.S.C. 154(b) by 530 days.

(21) Appl. No.: 15/338,617

(22) Filed: Oct. 31, 2016

(51) Int. Cl.
G06Q 30/00 (2012.01)
G06Q 30/06 (2012.01)
G06N 5/04 (2006.01)

(52) U.S. Cl.
CPC ......... G06Q 30/0631 (2013.01); G06N 5/04 (2013.01)

(58) Field of Classification Search
CPC .................. G06Q 30/0631; G06N 5/04
See application file for complete search history.

(56) References Cited

U.S. PATENT DOCUMENTS 6,505,185 B1 * 1/2003 Chickering .......... G06K 9/6282
706/55
2002/0194058 A1* 12/2002 Eldering ............... G06Q 20/20
705/14.65

(Continued)

FOREIGN PATENT DOCUMENTS

CA        2942325 A1 *  3/2018  .......... G06F 17/10
WO  WO-2011050205 A1 *  4/2011  .......... G06Q 10/04

OTHER PUBLICATIONS

Michael Bowles, Machine Learning in Python: Essential Techniques for Predictive Analysis, Copyright 2015, Wiley Publishing, ISBN 978-1-118-96174-2, Figure 6-1 on p. 214. (Year: 2015).*

(Continued)

*Primary Examiner* — Matthew E Zimmerman
(74) *Attorney, Agent, or Firm* — Ryan, Mason & Lewis, LLP

(57) ABSTRACT

Product planning techniques are provided that recommend compositions of product features for weighted heterogeneous consumer segments using regression trees. An exemplary method comprises obtaining historical consumer data comprising product preferences for existing product items for multiple consumer segments; obtaining product features indicating characteristics for each existing product item; prioritizing the consumer segments by obtaining a weight indicating an interest in each consumer segment; computing a total performance metric, for each product item, by calculating a dot product between the consumer segment weights and respective preferences of the consumer segments regarding a given product item; obtaining a regression tree from the existing product items to predict the total performance metric in terms of corresponding product features; and selecting a combination of the product features to be used in future product items based on identified paths in the regression tree.

20 Claims, 7 Drawing Sheets

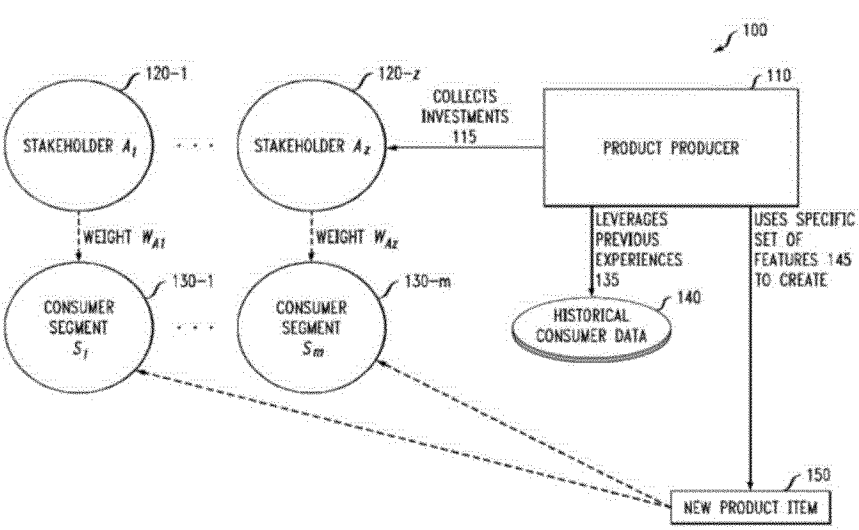

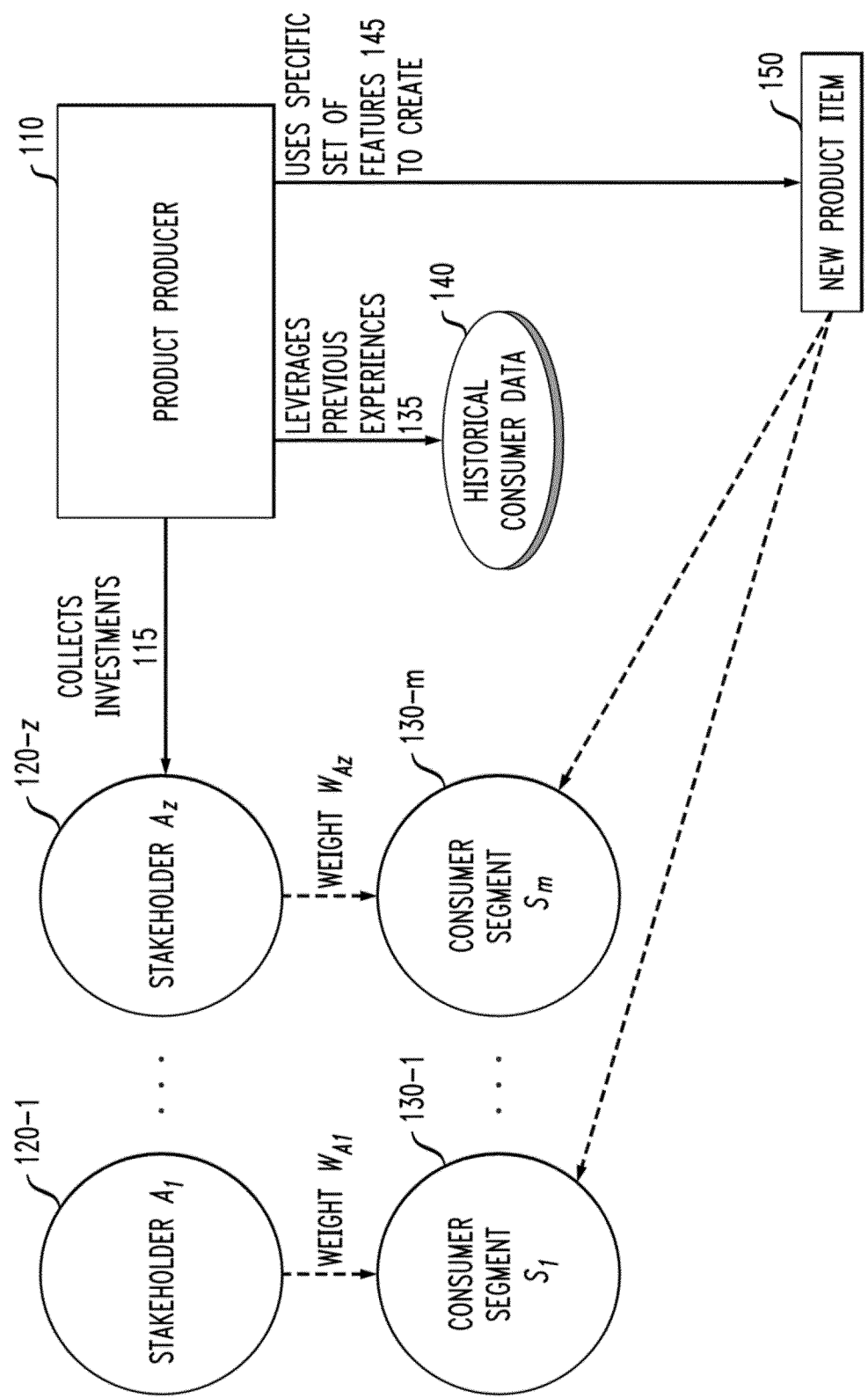

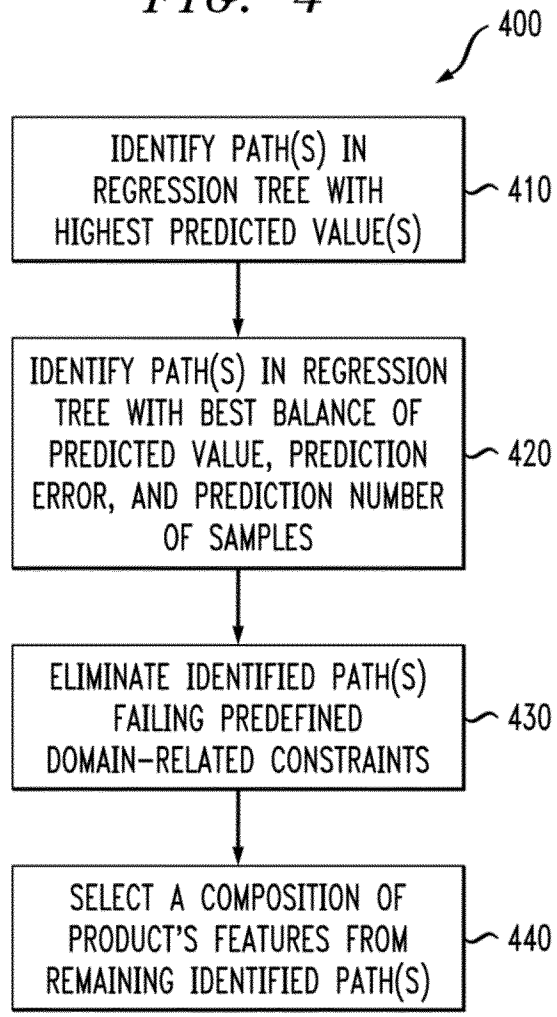

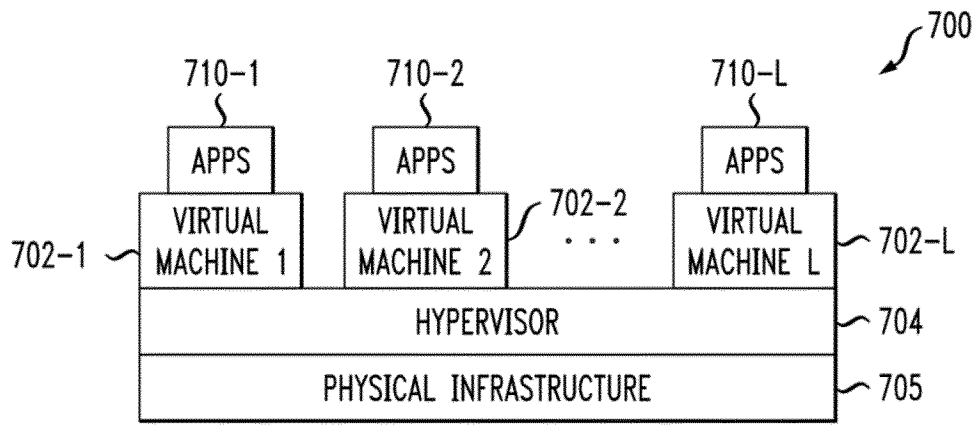
FIG. 7
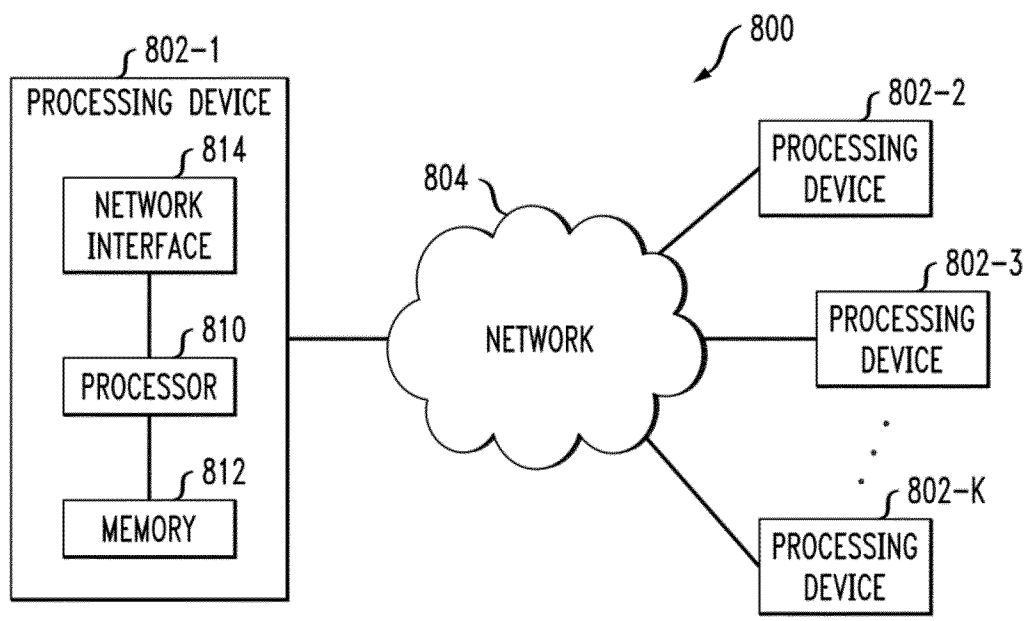
FIG. 8